May 26, 1953  M. W. PIKE  2,639,753
TIRE CHAIN AND CHAIN TIGHTENER
Filed Jan. 17, 1950  3 Sheets-Sheet 1
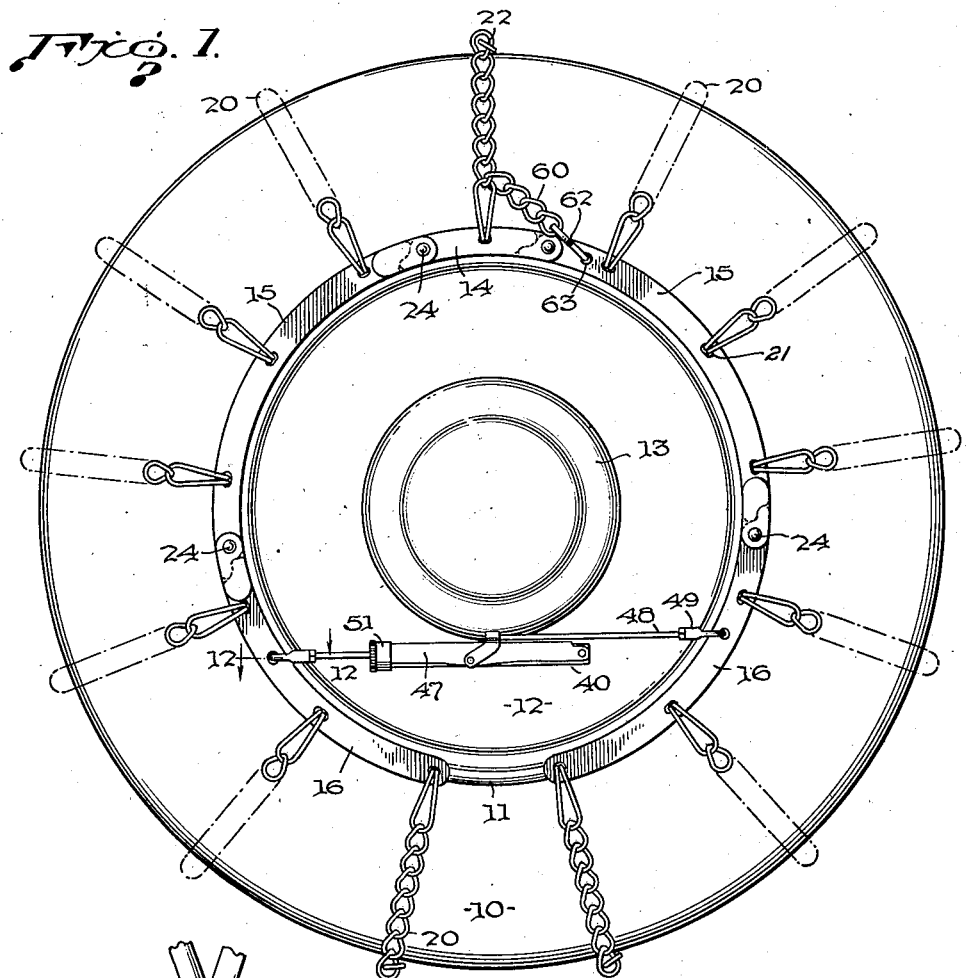
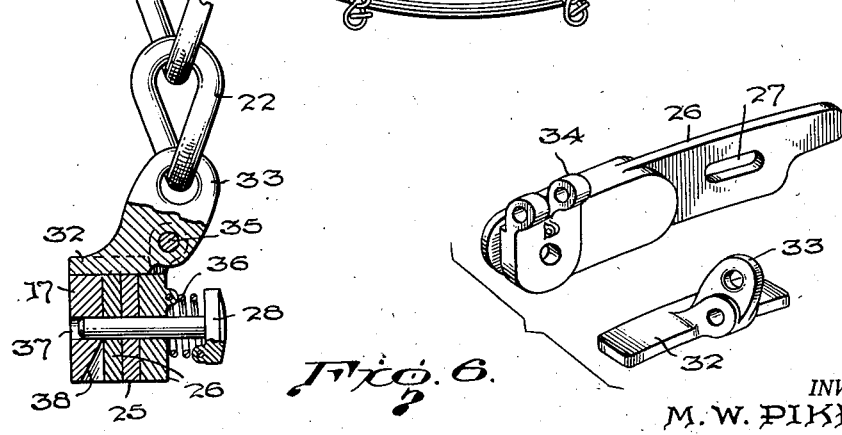
INVENTOR.
M. W. PIKE
BY
Estabrook & Estabrook
ATTORNEYS May 26, 1953  M. W. PIKE  2,639,753
TIRE CHAIN AND CHAIN TIGHTENER
Filed Jan. 17, 1950  3 Sheets-Sheet 2
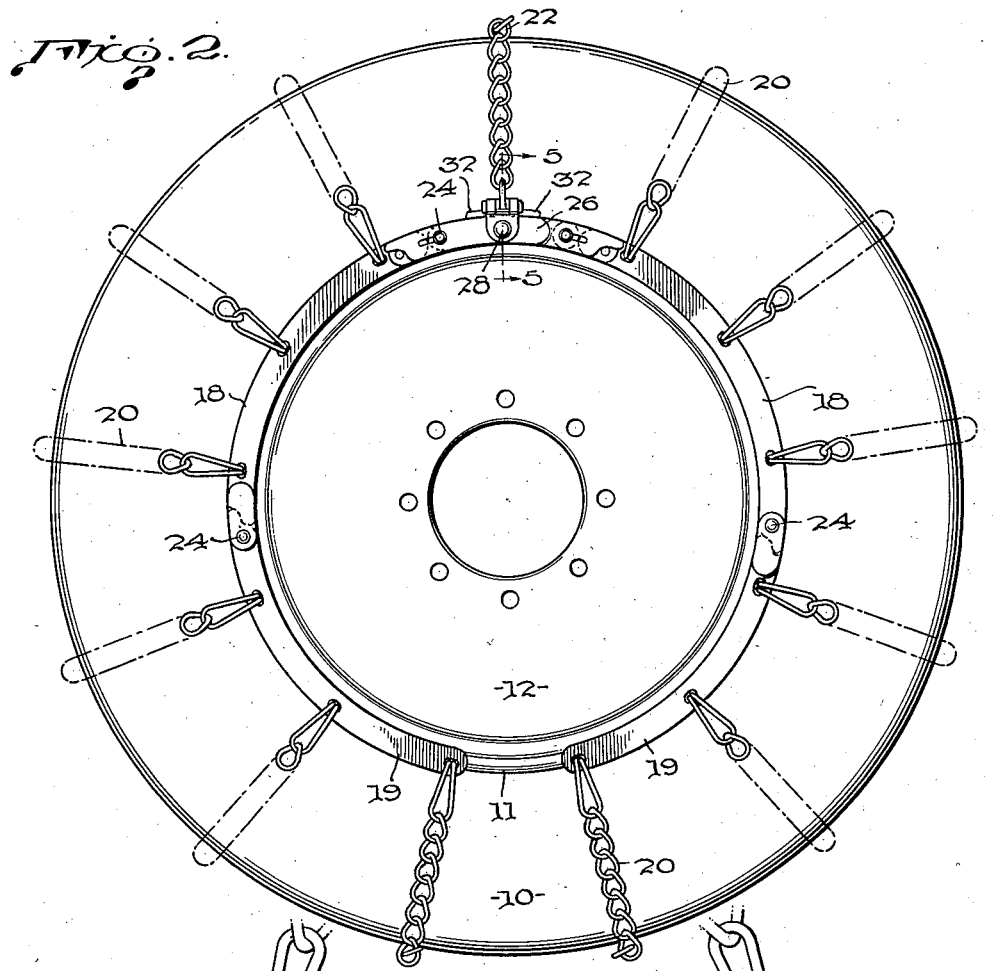
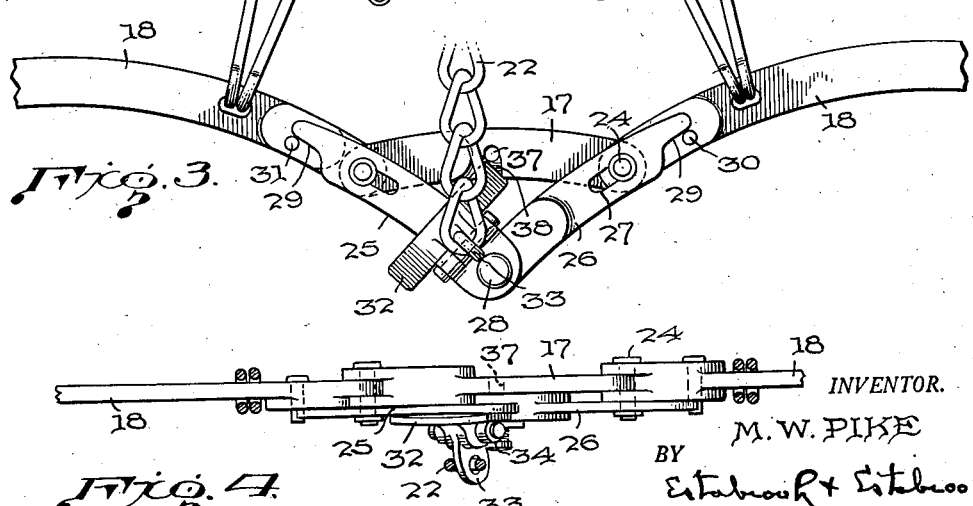
INVENTOR.
M. W. PIKE
BY Estabrook & Estabrook
his ATTORNEYS May 26, 1953  M. W. PIKE  2,639,753
TIRE CHAIN AND CHAIN TIGHTENER
Filed Jan. 17, 1950  3 Sheets-Sheet 3
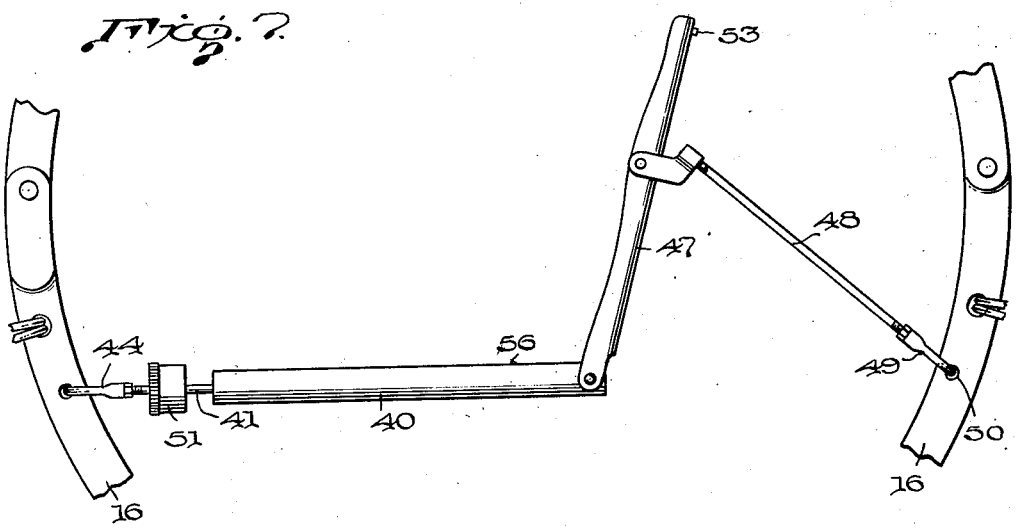
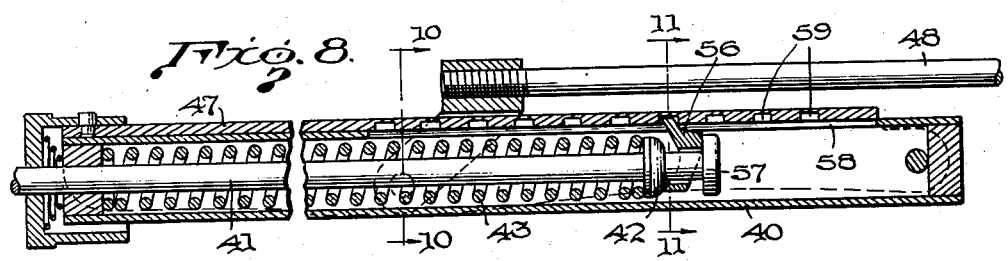
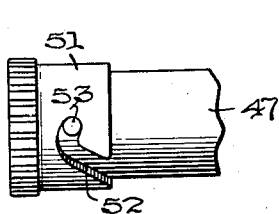
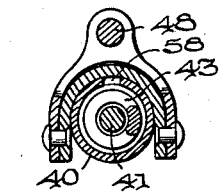
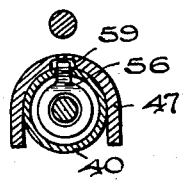
Fig. 9.  Fig. 10.  Fig. 11.
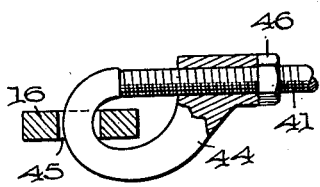
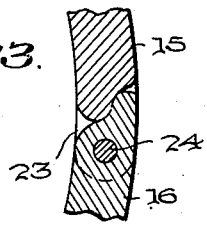
Fig. 12.  Fig. 13.  Fig. 14.
INVENTOR.
M. W. PIKE
BY Estabrook & Estabrook
his ATTORNEYS Patented May 26, 1953

2,639,753

UNITED STATES PATENT OFFICE 2,639,753

TIRE CHAIN AND CHAIN TIGHTENER

Milow W. Pike, Omaha, Nebr.

Application January 17, 1950, Serial No. 139,027

1 Claim. (Cl. 152—242)

This invention relates to an improvement in tire chain and tightener and more particularly to the type of tire chains capable of application to a tire without the necessity of raising the wheel from the ground.

The invention consists of a tire chain employing a plurality of cross chains, the ends of which are connected to sectional ring like members disposed on each side of the wheel, and a tightening means applied to at least one of said sectional ring like members for placing the sections of each ring member under tension to maintain the cross chains sufficiently taut so that the cross chains will have the necessary gripping action on the tire to afford a good friction surface for the tire to increase the traction of the tire under adverse weather conditions and in traveling over or through mired surfaces.

A purpose of the invention is to provide a tire chain which may be easily and readily applied or removed from a tire without the necessity of elevating the wheel from the ground, and further that as the wheel or tire is rotated the tightening means will maintain the chain at the proper tautness for obtaining the greatest traction efficiency.

The invention consists in certain novel features of construction and combinations of parts which will be hereinafter described and pointed out in the claim.

In the accompanying drawings:

Figure 1 is a view in side elevation of a tire showing the invention applied to the outer surface of a tire;

Figure 2 is a similar view showing the invention applied to the inner or rear side of the tire and wheel;

Figure 3 is a detailed view in elevation showing the toggle locking means for the inner or rear sectional ring like member before the sectional members are secured upon the wheel;

Figure 4 is a detail top plan view of the parts shown in Figure 3;

Figure 5 is a detailed view in section of the locking pin in locked position for securing the toggle levers to one of the sections of the ring like member, and showing the cam member for bringing the levers and segments into alignment so that the locking pin will be brought into registry with the opening in one of the sections;

Figure 6 is a detail view in perspective, showing the cam disconnected from its toggle lever;

Figure 7 is a view in elevation, showing the tightening means applied to oppositely disposed sections of the innermost ring member.

Figure 8 is a longitudinal detailed sectional view of a portion of the chain tightener;

Figure 9 is a detailed view in elevation showing the manner of securing the lever of the tightener to the cylinder;

Figure 10 is a sectional view on line 10—10 of Figure 8;

Figure 11 is a sectional view taken on line 11—11 of Figure 8;

Figure 12 is a detailed view, particularly in section, showing the manner of connecting one end of the chain tightener to a sectional member;

Figure 13 is a detailed sectional view of the hinged joint between the sections of the ring members;

Figure 14 is a detailed cross sectional view illustrating the bifurcated end of a section.

In the drawings, 10 represents a tire having a rim 11 mounted on a wheel 12, which latter is provided with a hub cap 13. The tire chain consists of two circular hoops or rings which are in complete circles, each comprising a plurality of light-weight arcuate shaped metal sections. The outer or front sectional ring like member consists of an arcuate top section member 14, to the ends of which are hinged sectional arcuate members 15, and to free ends of the sections 15 are hingeably connected arcuate section members 16. The oppositely disposed section members 16 are spaced apart at their free ends so that when the ring member is in its closed or applied position to the wheel a substantial amount of the wheel rim 11 is exposed.

The inner or rear ring member is in many respects similar to the front or outer member just described, and consists of an arcuate top section 17, to which are connected sections 18 and 19, the lowermost sections 19 being spaced apart similar to the sections 16 of the front or outer member. Cross chains 20 are connected to the sections 15 and 18 and 16 and 19. The ends of the cross chains 20 may be connected to these sections in any suitable manner, but as shown the free ends of the cross chains pass through openings 21 in the sections 15, 16, 18 and 19.

The several ring sections or links are joined together by a hinge joint as particularly illustrated in Figure 13, wherein one of the sections or links is provided at one end with a bifurcation 23 for the reception of the next adjacent section or link which is pivotally connected to the first mentioned section or link by a pivot pin 24. In Figure 13 the two sections or links shown and designated 15 and 16, wherein the sections 15 in this instance is provided with a bifurcated end 23. It is to be noted that the adjoining ends of the sections 15 and 16 are in abutting and overlapping relation which insures that the links or sections will always swing inwardly toward the center of the sectional ring like members. This is one form of a hinge joint that might be employed.

Referring to Figures 2, 3 and 4, the top section 17 has the sections or links 18 pivotally connected thereto by means of the pivot pins 24. Mounted on the pivot pins 24 of the top section or link 17 are two levers 25 and 26. Each lever is provided with an elongated slot 27 to allow the levers to have a sliding movement on the pivot pins 24. The two levers are connected together by a pivot pin 28 so that these levers function as a toggle. The free ends of each lever are bevelled or reduced as at 29, on its lower face and this bevelled or reduced portion rests and slides upon guide pins 30 and 31, projecting from the sides of the two sections or links 18.

A plate 32 is curved lengthwise on its under surface to conform to the upper surfaces of the links or sections 17, 25 and 26 as illustrated in Figure 5. This plate 32 is provided with an arm 33 projecting upwardly from its upper surface, which arm is disposed between ears 34 formed along one side and adjacent the pivoted end of the lever 26 by means of a pivot pin 35. A cross chain 22 is connected to the arm 33 and at one end thereof and its opposite end is connected to the top section or link 14 of the ring member located on the front or outer side of the wheel.

When the inner and outer ring members are applied to the tire the toggle levers 25 and 26 will be drawn into registry or parallelism with the top section or link 17 and the plate 32 will be caused to ride over the upper surface of the link or section 17 and brought to rest to overlie the upper surface of the link or section 17 and the pivoted ends of the levers 25 and 26. The pivot pin 28 is urged inwardly by a spring 36 and when the section or link 17 and pivoted ends of the levers 25 and 26 are brought into parallelism and held in such position by the plate 32 the pin will enter an opening 37 in the section or link 17 for securing section 17 and the levers 25 and 26 together, thereby locking the inner or rear ring member in place. The lower outer surface of the link or section 17 is bevelled as at 38 to permit the end of the pin to ride up the surface of the section or link and cause it to enter the opening 37 when the parts are brought into alignment.

Connected to the front or outer ring member is a chain tightener consisting of a cylinder 40 in which is mounted a rod 41 provided with a piston 42 at one end. Encircling the rod 41 is a coiled spring 43 disposed between an end of the cylinder 40 and the piston 42. The outer end of the rod 41 is provided with a hook 44, which passes through an opening 45 in one of the sections or links 16. The rod 41 is preferably threaded to the hook 44 so that the hook may be securely connected to the section or link 16, and a lock nut 46 is screwed on the rod 41 and against the hook 44 for holding the hook in engagement with the end of the rod 41. A handle or lever 47 is pivoted to the inner end of the cylinder and pivotally connected to the lever is a second rod 48, which is provided with a hook 49 for engaging the section or link 16 on the opposite side of the ring like member from the hook 44. This hook 49 passes through an opening 50 and is capable of being attached or removed at the will of the operator. When the handle or lever is swung toward the cylinder, from the position shown in Figure 7 the sections or links of the front or outer member of the ring member will be drawn toward each other and bringing the free ends of the sections 16 in adjacent but spaced relationship. The handle or lever 47 when brought into engagement with the cylinder 40 is held in such position by a sleeve 51, which fits over the end of the cylinder 40. The sleeve 51 is provided with a bayonet slot 52 for engagement with a pin or stud 53 which projects above the surface of the handle 47 and in this manner locks the handle to the cylinder and maintains the sections of the outer ring member in their innermost position.

The inner end of the rod 41 is provided with a collar 57 and loosely disposed on the rod between the collar 57 and piston 42 is a loosely mounted pawl or dog 56. The cylinder 40 is provided with an elongated slot 58 through which the pawl projects and slides as the rod 41 moves within the cylinder. The handle 47 is provided with a plurality of transverse openings or slots 59 and when the handle is moved to a position for engagement with the cylinder 40 the pawl will project through an opening 59 and prevent the links or sections of the inner ring member from moving outwardly toward the periphery of the tire due to the tension that has been placed upon the spring 43 when the lever 47 is attached to the cylinder 40 by the sleeve 51. However, should there be any slack in the cross chains that requires taking up the spring being under tension would exert a force on the piston 42 and move the rod 41 toward the opposite end of the cylinder and thereby cause the dog or pawl to engage another slot or opening in the handle 47 to take up any slack that may occur in the cross chains. The chain tightener when the lever 47 is secured to the cylinder 40 preferably extends horizontally with respect to the base of the wheel and parallel to the road surface and is situated above the bottom links or sections and in line with the recessed portion that exists between the hub cap and rim of the wheel. Any suitable covering (not shown) may be applied over the openings or slots 59 to prevent the ingress of moisture and dirt.

As previously related the present tire chain is intended for application to tires without elevating the wheel or tire from the ground, and also to make it adaptable and usable with cars having low fenders or skirts which cover portions of the wheel. In applying the tire chain to a wheel one should cause the second ring member, having the toggle joint levers 25 and 26, located on the inner or rear side of the wheel and the other ring member positioned on the outer or front side of the wheel. After the chain has been draped over the wheel with the cross chains 20 and 22 resting on the tire, a small pull chain 60 attached to the cross chain 22 adjacent the top section or link 14 of the outer ring member is grasped for pulling the cross chain 22 taut, and this action will cause the toggle levers 25 and 26 to be drawn into parallelism with the top link 17. This action will cause the cam plate 32 to guide the levers into position with the link 17 and as it is pivotally connected to the lever 26 it will ride over the top or upper surface of the link 17 and cam or pry the levers 25 and 26 into parallelism and alignment with the link 17, as indicated in Figure 5, with the plate 32 finally positioned on the upper surfaces of the levers and link 17. When the levers 25 and 26, and link 17 are in such position the pivot pin 28 will be caused by action of the spring 36 to be projected into the opening 37 of the link 17 and locking these members together. The movement of the levers 25 and 26 on the pivots 24 of the link 17 causes the outer ends of these levers to travel and be guided by the guide and stop pins 30—31. This action will cause the links or sections 18 or 19 to move inwardly toward the center of the ring or axis of the wheel. These several sections or links 17, 18, and 19 are so hinged together that they cannot swing outwardly with respect to one another, but are urged inwardly by the action of the toggle levers toward the center of the ring member. When this is accomplished the inner ring member comprised of its several sections or links will assume a circular position, and is so held due to the toggle arrangement and locking of the toggles to the top section 17. After this operation is completed the pull chain 60 can be attached to one of the other cross chains or to one of the sections or links by a snap hook 62, as shown in Figure 1, passing through an opening 63 in the link 15.

The guide or stop pins 30 and 31 by their engagement with the reduced ends 29 of the levers 25 and 26 prevent the links or sections 18 and 19 from any outward movement, when the toggle levers are connected to the link 17 by the pin 28, because the movement of the links is in an inward direction to form a circular like member. The hinge connection between the sections insures this inward direction of movement.

The outer or front ring member is now caused to assume a circular shape and to take up any slack in the cross chains 20 and 22 as a result of applying the inner or rear ring member to the tire. This is accomplished by means of the cylinder 40 and lever 47, wherein the piston rod 41 which may be already attached to the link or section 16 by the hook 44. The rod 48 is now attached to the other section or link 16 on the opposite side and the lever then swung to a position to overlie the cylinder 40. This action of the lever exerts a pull placing the piston 41 under tension due to the compression of the spring 43 and when the lever 47 is attached to the cylinder by the sleeve 51, the several sections or links 14, 15 and 16 have been caused to assume the shape of a circle. The pawl or dog 56 has also been caused to enter an opening 59 in the handle 47 to insure against any retractive movement of the piston excepting for the purpose of taking up slack that may occur in any of the cross chains so that the two ring members are maintained in proper position on the wheel and the cross chains held in proper engagement with the tire to afford the proper traction for the tire. When the tire chain is in position, both ring members will overlie the rim 11 of the wheel.

From the foregoing it will be apparent that as these ring members are not complete circles and are composed of a series of arcuate sections or links, the tire chain may be readily applied and removed from the wheel without the necessity of elevating the wheel to apply the chains. Their removal is easily accomplished upon the release of the lever 47 and the retraction of the pin 28, which will release the several sections allowing them to swing freely with respect to the top sections 14 and 17.

I claim:

A tire chain, comprising an outer and an inner ring like member, each comprising a plurality of sections hinged together for swinging movement in one plane, cross chains connecting said sections of said outer and inner ring members for joining said ring members together, toggle levers pivotally connected to one of said sections of one of said ring members, means on other of said sections of said ring member having engagement with said levers, means for moving said levers with respect to said sections and causing said other sections of said ring member to be moved and positioned about the tire, and a cam plate pivoted to said toggle levers engaging said section to which the levers are pivoted for drawing said levers into parallelism with said section when said toggle is operated.

MILOW W. PIKE.

References Cited in the file of this patent

UNITED STATES PATENTS

| Number | Name | Date |
|---|---|---|
| 1,517,749 | Pigott | Dec. 2, 1924 |
| 1,758,944 | Grosch | May 20, 1930 |
| 1,822,748 | Rivers et al. | Sept. 8, 1931 |
| 2,094,228 | Zook | Sept. 28, 1937 |
| 2,176,637 | Miller | Oct. 17, 1939 |
| 2,469,235 | Lindenthaler | May 3, 1949 |
| 2,493,263 | Prehn | Jan. 3, 1950 |
| 2,502,102 | Davis | Apr. 25, 1950 |